No. 623,965. Patented May 2, 1899.
B. C. BALL.
VIBRATING TACHOMETER.
(Application filed June 21, 1897.)
(No Model.)
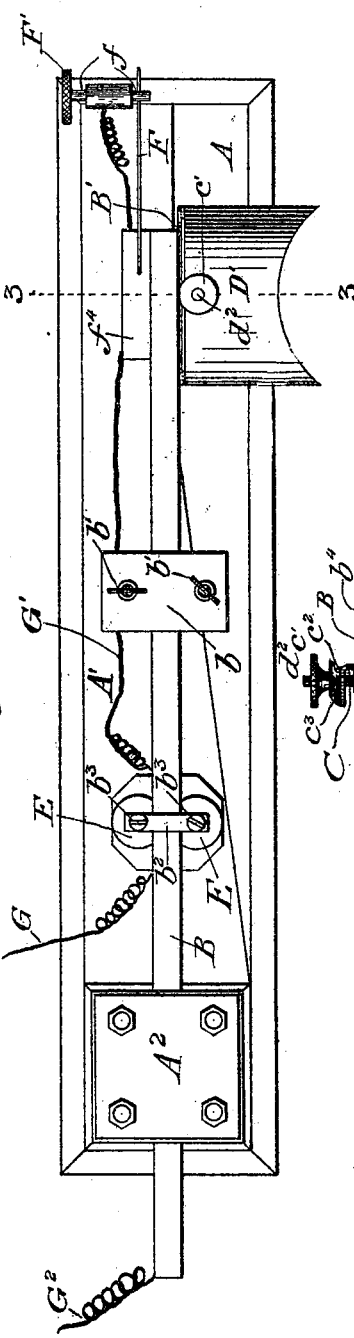
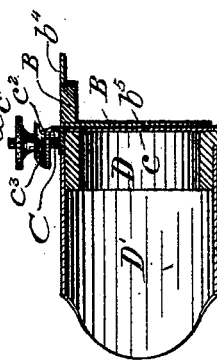
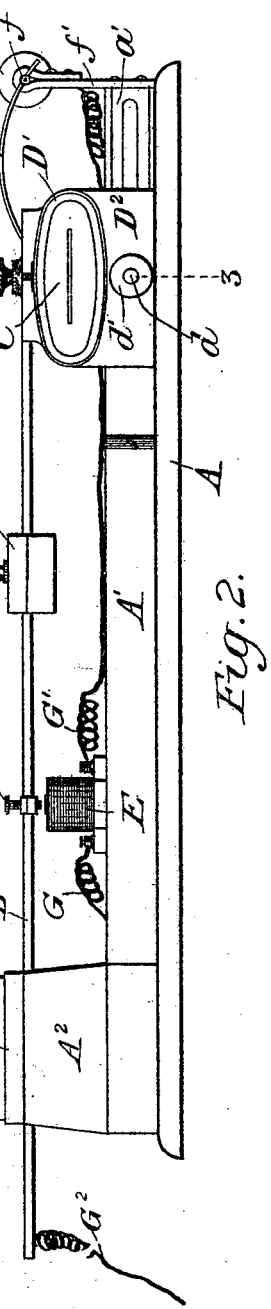
WITNESSES:
John Lord.
F. M. Slocum.
INVENTOR
Bert C. Ball
BY
Hallock & Lord
ATTORNEYS

UNITED STATES PATENT OFFICE.

BERT C. BALL, OF PLAINFIELD, NEW JERSEY.

VIBRATING TACHOMETER.

SPECIFICATION forming part of Letters Patent No. 623,965, dated May 2, 1899.

Application filed June 21, 1897. Serial No. 641,734. (No model.)

*To all whom it may concern:*

Be it known that I, BERT C. BALL, a citizen of the United States, residing at Plainfield, in the county of Union and State of New Jersey, have invented certain new and useful Improvements in Vibrating Tachometers; and I do hereby declare the following to be a full, clear, and exact description of the invention, such as will enable others skilled in the art to which it appertains to make and use the same.

This invention relates to tachometers; and it consists in certain improvements in the construction thereof, as will be hereinafter fully described, and pointed out in the claims.

More particularly my invention relates to that class of tachometers which operate by bringing the moving object into the line of vision with an intermittent exposure of the same frequency as the normal or desired repetitional movement of the object. To explain more fully, an object having rotary movement—as, for instance, a spoke of a fly-wheel of an engine—passes a certain point with each revolution or repetitional movement of the object. So, also, a reciprocating or oscillating object regularly passes and repasses a given point, or, in other words, has repetitional movement. It is well known that the retina of the eye or the mental organism connected therewith retains an impression of an object for some time after the vision has been interrupted or after the object has moved out of the line of vision. By reason of this a rapidly-moving object appears blurred, especially where the movement is repetitional, as the movement of a spoke in a rapidly-moving wheel. By reason also of this same retention of the impression if the exposure of the repetitionally-moving object is intermittent and momentary and of the same frequency as the repetitions of the movement of the object then the object will appear to be stationary, because the object will be at the same position with each exposure and the visual impression of the object will be retained in this position during the interval of the interruption of view. Now by having a momentary, regular, and intermittent exposure of a predetermined frequency an object having a repetitional movement in the line of vision at each exposure will appear to be stationary and move forward or backward, when the repetitions of movement are respectively of the same frequency, greater frequency, or lesser frequency than the exposures. For example, if a fly-wheel of an engine is exposed to the vision at regular intervals three hundred times in one minute and the wheel is running regularly and at exactly three hundred revolutions per minute then the wheel will be in exactly the same position at each exposure and will appear to be stationary; but if the wheel should make three hundred and one revolutions in one minute and this acceleration were regular then at each exposure the position of the wheel would be slightly in advance of the position at the preceding exposure, and the accumulated result of this advance would give the wheel the appearance of having made a complete revolution forward during the minute. On the other hand, if the wheel should make only two hundred and ninety revolutions in one minute then the wheel would appear to revolve backward ten revolutions during the minute, and, again, if the total revolutions of the wheel should be three hundred to the minute, but there were in the first half one hundred and sixty revolutions and in the last half one hundred and forty revolutions, (an example of what is known as "racing,") then the wheel would first appear to make ten revolutions forward and then ten revolutions backward. Reciprocating and oscillating objects appear in the same way— *i. e.*, appear to be stationary when their reciprocations or oscillations are of the same frequency as the exposures and appear to move forward when of greater frequency and backward when of less frequency. From this it will be seen that with a device utilizing this method the speed or variations of speed of repetitionally-moving objects can be accurately and minutely ascertained.

I have devised an instrument by means of which an intermittent exposure is obtained. This device is illustrated in the accompanying drawings as follows:

Figure 1 shows a plan of the device. Fig. 2 shows an elevation of the device. Fig. 3 shows a section on the line 3 3 in Figs. 1 and 2.

A marks the base; A', a superbase; A², a block on the base, to which is secured a spring-bar B by means of a cap $a$ placed over the bar. This bar B has a shutter B' at its outer end, in which is a slit $b^5$. Facing this shutter-plate is another plate C, having a slit $c$ normally in register with the slit $b^5$. A vizor D' is supported by a frame D, which is secured to the superbase by means of a bolt $d$, the head of which is back of a slotted plate $a'$. The bolt passes through the projection $D^2$ on the frame D and is provided with the thumb-nut $d'$, the turning of which clamps the frame D to the base.

The spring-bar operates on the principle of the tuning-fork, so that the frequency of vibration with each adjustment of the spring-bar is practically constant. If, therefore, the bar is set in motion, it will carry the slit $b^5$ into and out of register with the slit $c$, so that a line of vision through the slits will be momentary and unobstructed at regular intervals, the frequency of the view through the slits depending on the length of the bar and the distribution of its weight. If while the bar is vibrating a repetitionally-moving object is observed through the slits, the object will appear to be stationary or to move forward or backward, according to how the frequency of repetitions of the moving object correspond to the vibrations of the bar, as heretofore explained.

It is desirable to have means of adjusting the frequency of the vibrations of the bar. For this purpose a weight $b$ is placed on the bar and so secured as to be adjustable longitudinally of the bar, and set-screws $b'$ are provided to secure the weight in any position. This shifts the center of oscillation, and consequently the frequency of vibration, so that by this means any desired frequency of vibration may be obtained. The frequency of vibration may also be altered by shifting the bar in its support, thus changing its length, and when this is done the vizor and plate C can be adjusted by loosening the bolt $d$ and moving it along in the slot in the plate $a'$. To get the initial adjustment of a device, it may be placed before an object having a repetitional movement of known frequency and then adjusted by moving the weight so as to produce vibrations of the bar of the same frequency. The proper adjustment will be apparent when the repetitionally-moving object appears stationary when viewed through the slits. This position of the weight may be marked on the bar. Other positions of the weight to give vibrations of known frequency may be obtained in a like manner, so that the weight may be placed to give the desired frequency at any time. These marks of course are not essential where the tachometer is used simply to ascertain the variations in speed rather than the actual speed. Where it is desired to simply ascertain variations in the speed of a repetitionally-moving object, the tachometer may be placed in the line of vision leading to the said object and the weight adjusted to give a vibratory movement that will give the object a stationary appearance. The variations from this speed can then be readily ascertained, as hereinbefore described. The adjustment of the weight changes slightly the position of the slit $b^5$ relatively to the slit $c$. In order to bring them into register, the plate C is arranged in a slide and suspended from a housing $c^3$, which engages a thumb-nut $c'$. The thumb-nut is carried by a screw $d^2$, extending from the frame D. By turning the nut $c'$ the plate C may be raised or lowered and the slits brought into register. It is also desirable that the vibrations of the bar should be prolonged and continuous, and for this purpose I have provided means for keeping the bar in continuous action. A magnetic coil E is placed under an armature $b^2$ on the bar. Adjusting screws $b^3$ are provided to regulate the proximity of the armature to the coils. A contact-spring F is arranged at the end of the bar. A wire G, connected with an electric supply, is connected with the coils. The coils are connected with the contact-spring F by wire G'. A return-wire $G^2$ leads from the opposite end of the bar to complete the circuit. This forms the ordinary make and break between the contact-spring F and the bar, which, operating in the well-known manner, causes a continuous vibration of the bar. The spring F is carried by a shaft $f$, which is journaled in an upright $f'$ with sufficient frictional resistance to maintain it in place. A thumb-wheel is placed on the shaft to throw the contact-spring out of the path of the bar to permanently open the circuit and stop the instrument.

What I claim as new is—

1. In a tachometer, the combination of a vibrating spring-bar, as B; and a shutter opened and closed by the vibratory movement of said bar, said shutter being so located and arranged that an exposure by it may be brought into the line of vision directed to an object the rapidity of the movement of which is to be ascertained.

2. In a tachometer, the combination of a vibratory spring-bar, as B; means of shifting the center of oscillation of said bar; and a shutter opened and closed by the vibratory movement of said bar, said shutter being so located and arranged that an exposure by it may be brought into the line of vision directed to an object the rapidity of the movement of which is to be determined.

3. In a tachometer, the combination of a vibratory spring-bar, as B; means acting upon said bar to make its movement continuous; and a shutter opened and closed by the vibratory movement of said bar, said shutter being so located and arranged that an exposure by it may be brought into the line of vision directed to an object the rapidity of the movement of which is to be ascertained.

4. In a tachometer, the combination of a vibratory spring-bar, as B; a magnetic coil arranged to exert force upon said bar in one direction; an electric medium completing a circuit through said coils; means for opening said circuit with each movement of the bar incident to the force of the coil; and a shutter opened and closed by the vibratory movement of the bar, said shutter being so located and arranged that an exposure by it may be brought into the line of vision directed to an object the rapidity of the movement of which is to be ascertained.

In testimony whereof I affix my signature in presence of two witnesses.

BERT C. BALL.

Witnesses:
H. C. LORD,
C. M. IRELAN.